US012548392B2

(12) United States Patent
Apsley et al.

(10) Patent No.: US 12,548,392 B2
(45) Date of Patent: Feb. 10, 2026

(54) SYSTEMS AND TECHNIQUES FOR ACCESSING MULTIPLE ACCESS POINTS WITHIN A FACILITY USING A SINGLE AUTHENTICATION INSTANCE

(71) Applicant: JANUS INTERNATIONAL GROUP, LLC, Temple, GA (US)

(72) Inventors: Spencer Apsley, Lehi, UT (US); Alan Campbell, Douglasville, GA (US); Christine Debord, Canton, GA (US); Nathan Perry, Eagle Mountain, UT (US)

(73) Assignee: Janus International Group, LLC, Temple, GA (US)

( * ) Notice: Subject to any disclaimer, the term of this patent is extended or adjusted under 35 U.S.C. 154(b) by 217 days.

(21) Appl. No.: 18/483,561

(22) Filed: Oct. 10, 2023

(65) Prior Publication Data
US 2024/0127654 A1   Apr. 18, 2024

Related U.S. Application Data

(60) Provisional application No. 63/379,156, filed on Oct. 12, 2022.

(51) Int. Cl.
*G07C 9/32* (2020.01)
*G07C 9/00* (2020.01)

(52) U.S. Cl.
CPC ........... *G07C 9/32* (2020.01); *G07C 9/00896* (2013.01); *G07C 2209/64* (2013.01)

(58) Field of Classification Search
None
See application file for complete search history.

(56) References Cited

U.S. PATENT DOCUMENTS

| | | | | |
|---|---|---|---|---|
| 9,745,130 | B1 * | 8/2017 | Rawal | G06Q 10/0875 |
| 10,665,047 | B1 * | 5/2020 | Terp | G06Q 20/127 |
| 10,708,722 | B1 * | 7/2020 | Klinkner | G01S 5/02 |
| 11,562,610 | B2 * | 1/2023 | Alamin | G07C 9/00571 |
| 11,574,512 | B2 * | 2/2023 | Morris | G07C 9/00309 |
| 11,765,588 | B2 * | 9/2023 | Pirch | G07C 9/27 |
| 2018/0191889 | A1 | 7/2018 | Gerhardt et al. | |
| 2019/0319939 | A1 | 10/2019 | Hamel et al. | |
| 2021/0054661 | A1 | 2/2021 | Mantena et al. | |

OTHER PUBLICATIONS

Search Report and Written Opinion; International Patent Application No. PCT/US2023/034772; Jan. 31, 2024.
International Preliminary Report on Patentability in PCT/US2023/034772, mailed Apr. 24, 2025.

\* cited by examiner

*Primary Examiner* — K. Wong
(74) *Attorney, Agent, or Firm* — Barnes & Thornburg LLP

(57) ABSTRACT

Devices, systems, and methods are presented for controlling user access to one or more access points of a self-storage facility using a single authentication instance. Such instances can include detecting that the user is within physical proximity of one of the one or more access points to which the user is authorized to access, and activating an unlocking mechanism associated with the one of the one or more access points responsive to detection of physical proximity.

20 Claims, 5 Drawing Sheets

SYSTEMS AND TECHNIQUES FOR ACCESSING MULTIPLE ACCESS POINTS WITHIN A FACILITY USING A SINGLE AUTHENTICATION INSTANCE

CROSS-REFERENCE

This utility patent application claims the benefit of priority to U.S. provisional application No. 63/379,156, filed on Oct. 12, 2022, entitled "SYSTEMS AND TECHNIQUES FOR ACCESSING MULTIPLE ACCESS POINTS WITHIN A FACILITY USING A SINGLE AUTHENTICATION INSTANCE," the contents of which are hereby incorporated by reference in their entirety.

FIELD

The present disclosure generally relates to a system and techniques for providing access to (or accessing) multiple access points within a facility using a single authentication instance.

Self-storage facilities rent storage space to tenants such as individuals and businesses. A self-storage facility may separate its storage space by unit. While a unit can be anything from lockers, containers, to even outdoor spaces, a typical unit often corresponds to an enclosed and climate-controlled room that is accessible via a lockable door. A self-storage facility may grant access to the property and/or a given unit though various means, such as a physical key, a unique code to be input on a keypad, a digital key generated using tenant credentials, some combination of these means, and others.

Generally, a self-storage facility has a number of access points that require a tenant to have valid credentials to be able to pass. These access points can include a gate securing the entrance to the exterior of the facility, a door leading to the storage unit area, elevators, storage units, and so on. Valid credentials can include an access code for user entry, a key fob or card for wireless communication, or a mobile device for wireless communication. Typically, when the tenant approaches each access point, the user would need to engage with the access point to pass, such as by using an access code at the keypad, waving the key fob or key card at an electronic reader controlling a door lock, or transmitting a signal to the electronic reader via an app on the mobile device. Given the amount of access points that a user may interact with, such actions can be burdensome. For instance, a common scenario for a tenant/user involves moving large equipment in or out of a storage unit. In such a scenario, the tenant/user would need to set aside the large equipment each time an access point is reached, which can lead to inefficiency and more time spent at the self-storage facility.

SUMMARY

Embodiments presented herein disclose a system and techniques for providing access to (or accessing) multiple access points and/or units within a facility using a single authentication instance.

According to one aspect of the present disclosure, a method for controlling user access to one or more access points of a self-storage facility using a single authentication instance may include detecting a mobile device of a user entering a predefined geofence of the self-storage facility; upon determining, based on credentials of the user, that the user is authorized for access in the self-storage facility, generating an authentication to grant entry to the user to one or more access points to which the user is authorized to access; and upon detecting that the user is within a physical proximity of one of the one or more access points to which the user is authorized to access, activating an unlocking mechanism associated with the one of the one or more access points. In some embodiments, detecting the mobile device may include connection of the mobile device with a local network of the self-storage facility. Connection of the mobile device with the local network of the self-storage facility may include connection with at least one of a wifi and mesh network of the self-storage facility.

In some embodiments, detecting the mobile device may include receiving a visit request from a mobile device for access to the self-storage facility. In some embodiments, generating an authentication may include generating an authentication token.

In some embodiments, the method may further include determining, based on credentials of the user, that the user is authorized for access in the self-storage facility. Determining that the user is authorized for access in the self-storage facility may include confirming user account registration. Confirming user account registration may include confirming a username and password received from the mobile device. In some embodiments, determining that the user is authorized for access in the self-storage facility may include confirming an immediately-generated passcode communicated to the mobile device and received as confirmation.

In some embodiments, activating an unlocking mechanism associated with the one of the one or more access points may include sending an unlocking command to a locking device associated with an access door of the one or more access points. The unlocking command may permit the user to manually unlock the access door. In some embodiments, the method may further include detecting that the user is within a physical proximity of one of the one or more access points to which the user is authorized to access. Detecting that the user is within the physical proximity of one of the one or more access points may include receiving location data from the mobile device, and determining proximity of the mobile device relative to the one of the access points. The physical proximity may include a threshold distance from the one of the access points.

In some embodiments, detecting that the user is within the physical proximity of one of the one or more access points includes receiving indication that the user is within local communication range of the one access point. Receiving indication that the user is within local communication range may include local communication between the mobile device and a local communication device associated with the one access point. Local communication between the mobile device and a local communication device associated with the one access point may include bluetooth.

In some embodiments, the method may further include detecting that the user is within a physical proximity of another one of the one or more access points to which the user is authorized to access. The method may further include activating an unlocking mechanism associated with the other one of the one or more access points. Activating an unlocking mechanism associated with the other one of the one or more access points may be conducted without re-authentication.

In some embodiments, the method may further include receiving instruction from the mobile device for enabling access without additional authentication. The instruction may be received in response to a request to the mobile device for enabling access without additional authentication.

According to another aspect of the presenting disclosure, a system for controlling user access to one or more access points of a self-storage facility using a single authentication instance may include a control system including at least one processor for executing instructions stored on memory for: detecting a mobile device of a user entering a predefined geofence of the self-storage facility; upon determining, based on credentials of the user, that the user is authorized for access in the self-storage facility, generating an authentication to grant entry to the user to one or more access points to which the user is authorized to access; and responsive to detecting that the user is within physical proximity of one of the one or more access points to which the user is authorized to access, activating an unlocking mechanism associated with the one of the one or more access points.

According to another aspect of the present disclosure, a method for controlling user access to one or more access points of a self-storage facility using a single authentication instance may include receiving indication from a mobile device that a user has entered a proximity of the self-storage facility; upon determining, based on credentials of the user, that the user is authorized for access in the self-storage facility, generating an authentication to grant entry to the user to one or more access points to which the user is authorized to access; and detecting that the user is within physical proximity of one of the one or more access points to which the user is authorized to access, and activating an unlocking mechanism associated with the one of the one or more access points responsive to detection of physical proximity.

In some embodiments, the activation may be performed without additional authentication. In some embodiments, the method may further include detecting that the user is within physical proximity of another one of the one or more access points to which the user is authorized to access. The method may further include activating an unlocking mechanism associated with the other one of the one or more access points responsive to detection of physical proximity. The activation of the unlocking mechanism associated with the other one of the one or more access points may be performed without additional authentication.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

DETAILED DESCRIPTION

Figure 1:
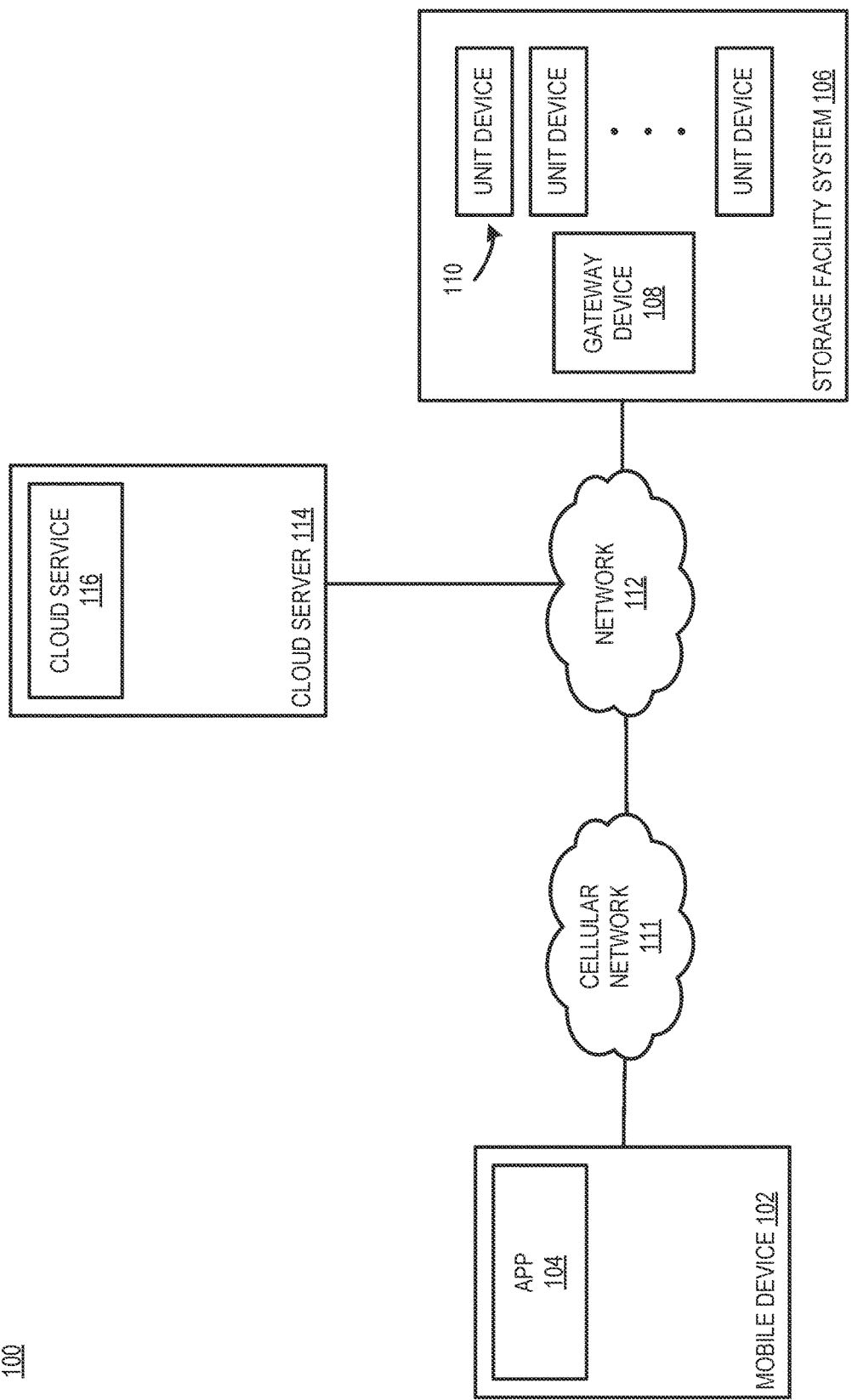
FIG. 1 illustrates an example environment in which a mobile device may interface with a storage facility system to access multiple access points of the storage facility system using a single authentication instance, according to an embodiment.

Embodiments presented herein disclose systems and techniques for accessing and providing access to multiple points of entry within a facility, such as a self-storage facility. In an embodiment, a storage facility system includes one or more access control devices connected as part of a communication network, such as by one or more gateway devices connected to a cloud network. Further, a mobile device of a tenant user includes a mobile app that can allow the user to interface with the storage facility system (e.g., via communication with the cloud network). The storage facility system may establish a geofence around the underlying facility that allows for detection of the tenant user (via location services on the mobile device) entering the premises.

As further described herein, the tenant user may, via the app executing on the mobile device, enable a "one-touch unlock" feature at the storage facility system that allows the tenant user to enter access-controlled passages (authorized for the user) once initially authenticated with the system. While the one-touch unlock feature is enabled, the mobile device, when in physical and/or network proximity with an access point within the facility (e.g., an access control device controlling a lock to an passageway, a storage unit, etc.), initiates a wireless communication with the access point and transmits access credentials (e.g., a unique digital key) to the access point. If the user is authorized, the access point will grant access to the user. Advantageously, the one-touch unlock feature allows a tenant user to pass through authorized access points without requiring the user to re-produce the mobile device (or other access credential like a physical key or key fob) for entry.

In the illustrative embodiment, user authentication is embodied as token-based authentication. Upon appropriate confirmation of user credentials, such as through a confirmed registration account via the mobile app, an authentication token can be generated. A request for access can be received from the mobile device 102. The request can include identifying information, such as the user-account information (e.g., username/password) already registered. In response to the request for access, verification can be performed. Verification can include checking that the identifying information accurately matches with the access being requested. In response to successful verification, an authentication token can be generated. The authentication token can be sent to the mobile device 102 for storage and location communication for use, such as local Bluetooth communication to individual lock mechanisms within the facility. Such authentication is illustratively performed at the cloud level, but in some embodiments could be partly or wholly performed by the local self-storage facility 106. In some embodiments, authentication may include two-factor authentication. In some embodiments, authentication may include session-based authentication generating session identifiers for use in access requests.

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

FIG. 1 illustrates an example computing environment 100 in which a mobile device 102 may interface with a storage facility system 106 (via a cloud service 116 hosted on a cloud server 114) to enter one or more access points thereof, according to an embodiment. As shown, the mobile device 102 is connected to a cellular network 111, which in turn may provide the mobile device 102 with access to a network 112 (e.g., the Internet), although in some embodiments, the mobile device 102 may be configured for communication with the network 112 directly, for example, via or as a wifi, mesh network (e.g., wirepas), or similar local/private network of the storage facility once within appropriate range. The storage facility system 106 and cloud server 114 may also be connected to network 112. In some embodiments, the storage facility system 106 and cloud server 114 may be in communication with one another via a private network (not shown).

The mobile device 102 may be embodied as any physical computing device accessible by a user (e.g., a tenant user, an operator or employee of the storage facility system 106, a system administrator, etc.) having wireless communication functionality, such as a smart phone, smart tablet, laptop device, etc. The mobile device 102 may be owned by a tenant user, a device located on-site at the underlying self-storage facility, a device located remotely from the self-storage facility (e.g., at a management console associated with the self-storage facility), and so on. Illustratively, the mobile device 102 also includes an app 104. As further described herein, the app 104 allows the user to interface with the storage facility system 106 and access a variety of features provided by the system 106, including one-touch unlock capability for authorized access points within the self-storage facility.

In an embodiment, the storage facility system 106 comprises a local network (different from the network 112) of interconnected devices to control various features of the underlying self-storage facility, such as unit door control, HVAC settings and temperature control, tenant access, facility monitoring, and so on, in addition to the one-touch unlock authentication techniques described herein. Illustratively, the storage facility system 106 includes a gateway device 108 and one or more unit devices 110. The cloud server 114 may be embodied as one or more physical or virtual computing resources pooled together to provide cloud-based services, such as the cloud service 116. The cloud service 116 processes requests sent by the app 104 and transmits the processed requests to the storage facility system 106. The storage facility system 106 may also transmit information to the app 104 via the cloud service 116.

The gateway device 108 may be embodied as any physical computing or networking device (e.g., a router, hub device, switch, etc.) to communicate with devices within the storage facility system 106 and also with the cloud server 114. The unit devices 110 may be embodied as any physical computing or networking device (e.g., a networking beacon, an Internet-of-Things device, mobile device, etc.) that is co-located with an access point within the facility, such as a door, gate, elevator unit, storage unit entrance, and so on. Each unit device 108 may include a processor, memory, and network circuitry that enables wireless communication with the gateway device 108 and the app 104. The gateway device 108 may communicate using wireless protocols (e.g., Bluetooth, etc.) with the unit devices 110 to control the unit devices 110 or trigger the unit devices 110 to perform certain actions, such as triggering the unit device 110 to activate a locking mechanism on an access point to allow access.

In an embodiment, the storage facility system 106 may define a geofence surrounding a perimeter of the underlying self-storage facility to allow the storage facility system 106 to detect instances in which a tenant user possessing the mobile device 102 enters the premises of the facility. For example, to do so, the cloud service 116 may store a pre-defined specification of geofence coordinates for the facility. The app 104, during execution, may leverage a location services application programming interface (API) to communicate geolocation coordinates of the mobile device 102 to the cloud service 116. If the coordinates of the mobile device 102 are within range of the stored coordinates defined for the geofence, the cloud service 116 may determine that the tenant user is at the premises of the facility. Such determination provides an efficient method for providing services to an on-site tenant user, including a one-touch unlock functionality.

For instance, in an embodiment, once the storage facility system 106 has detected the presence of the mobile device 102 on-site, the cloud service 116 may authenticate the tenant user credentials and push a notification to the mobile device 102 prompting the tenant user over whether to enable the one-touch unlock feature after authentication. Upon enabling the feature, the app 104 may allow the tenant user to pass through authorized access points without additional credential-based authentication instances.

Figure 2:
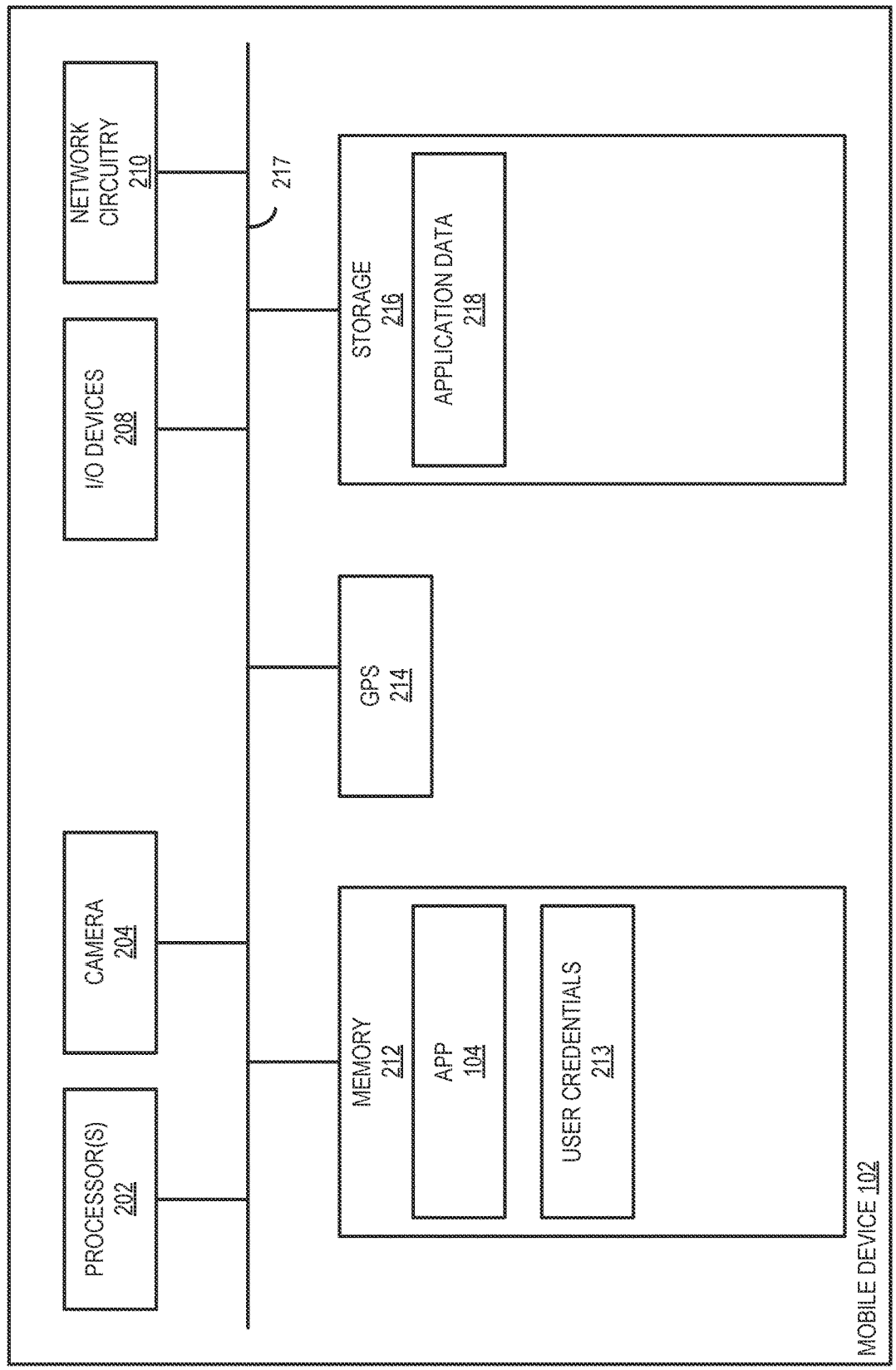
FIG. 2 illustrates a block diagram of the mobile device described relative to FIG. 1, according to an embodiment.

FIG. 2 further illustrates the mobile device 102, according to an example embodiment. As shown, the mobile device 102 includes, without limitation, one or more processors 202, a camera 204 and other I/O devices 208 coupled with an I/O device interface (not shown), network circuitry 210, a memory 212, a GPS 214, and a storage 216, each interconnected via a hardware bus 217. Of course, an actual mobile device 102 will include a variety of additional hardware components not shown.

The processor 202 retrieves and executes programming instructions stored in the memory 212, such as those of the app 104. Similarly, the processor 202 generates user credentials (e.g., dynamically generated login information and encryption/decryption keys, digital key credentials, etc.) 213 as well as stores and retrieves application data 218 (e.g., tenant user configuration information, user data, registered unit data, etc.) associated with the app 104 residing in the storage 216. The hardware bus 217 is used to transmit instructions and data between the interconnected components. The processor 202 is included to be representative of a single CPU, multiple CPUs, a single CPU having multiple processing cores, and the like. The memory 212 is generally included to be representative of memory and storage on a mobile device, e.g., DDR and flash memory spaces. The network circuitry 210 may be embodied as any hardware, software, or circuitry (e.g., a network interface card) used to connect the mobile device 102 over the network 112 and providing the network communication functions described above. The GPS 214 includes a receiver that obtains signals from radio navigation system satellites indicative of geolocation data of the mobile device 102.

The I/O device interface allows the camera 204 and other I/O devices 208 to communicate with hardware and software components of the mobile device 102. The I/O devices 208 may be embodied as any type of input/output device connected with or provided as a component to the mobile device 102, such as the speaker and microphone devices. I/O devices such as keyboards, mice, and printers may be included as I/O devices 212 (e.g., to print map of the storage facility indicating a location of a registered unit). As stated, the memory 212 includes the app 104 and user credentials 213.

Figure 3:
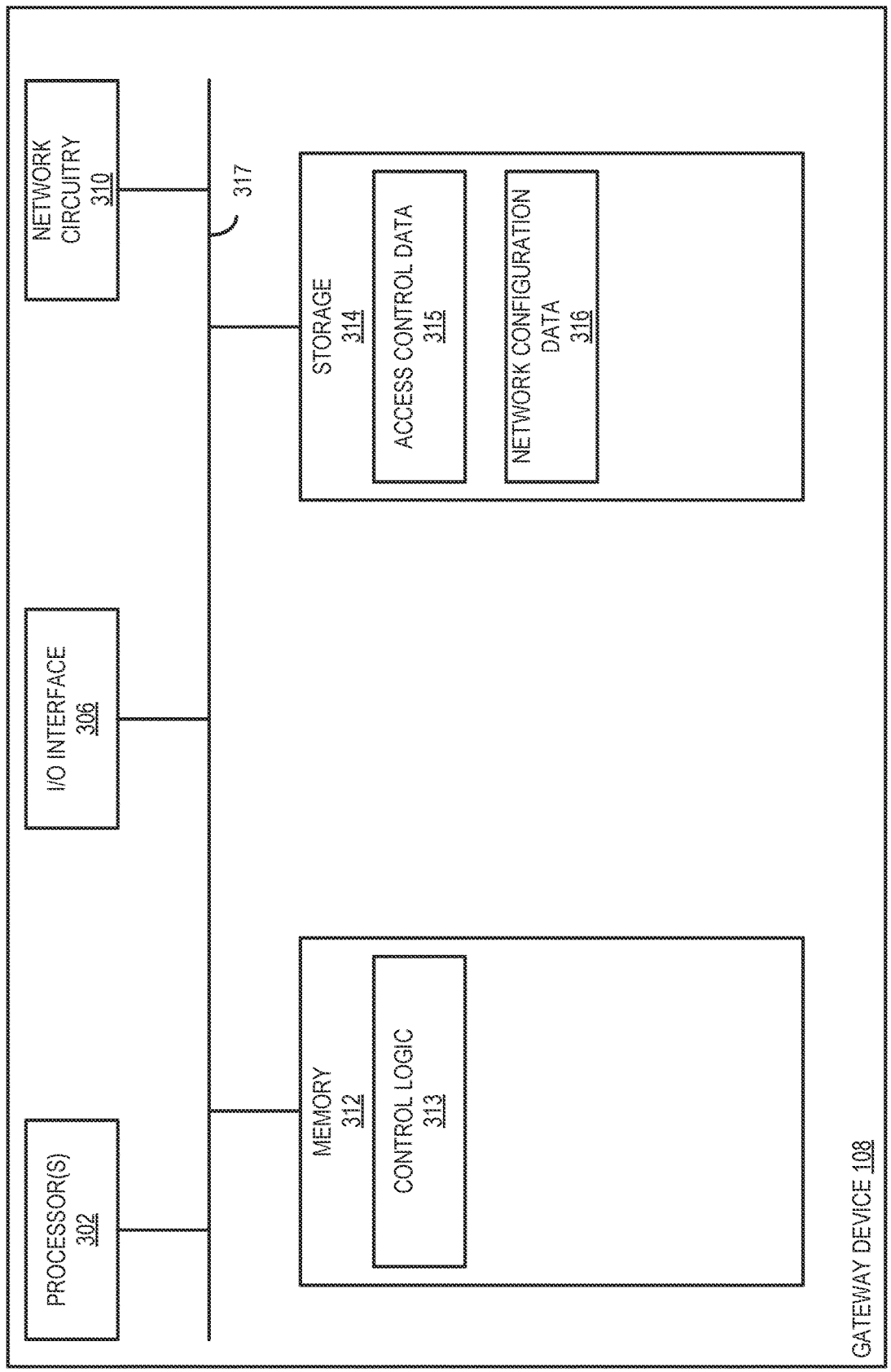
FIG. 3 illustrates a block diagram of the gateway described relative to FIG. 1, according to an embodiment.

FIG. 3 further illustrates the gateway device 108, according to an example embodiment. As shown, the gateway device 108 includes, without limitation, one or more processors 302, an I/O interface 306, a network circuitry 310, a memory 312, and a storage 314, each interconnected via a hardware bus 317. Of course, a gateway device 108 will include a variety of additional hardware components. Further, some components shown herein, such as the storage 314, can reside separate from the gateway device 108 (e.g., as cloud storage or a remote storage host).

The processor 302 retrieves and executes programming instructions stored in the memory 312, such as control logic 313. Similarly, the processor 302 stores and retrieves data residing in the storage 314, such as access control data 315 (providing access rules, policies, and user access privilege data for the underlying storage facility) and network configuration data 316 (e.g., network topology information, routing tables, etc.). The hardware bus 317 is used to transmit instructions and data between the processor 302, storage 314, network interface 310, and the memory 312. The processor 302 is included to be representative of a single CPU, multiple CPUs, a single CPU having multiple processing cores, and the like. The memory 312 is generally included to be representative of memory and storage on a mobile device, e.g., DDR and flash memory spaces. The network circuitry 310 may be embodied as any hardware, software, or circuitry (e.g., a network interface card) used to connect the gateway device 108 over one or more networks (e.g., to the network 112 and to a local area network) and providing the network communication functions described above.

The I/O interface 306 allows I/O devices (not shown) to communicate with hardware and software components of the gateway device 108. The I/O devices may be embodied as any type of input/output device that can be connected with or provided as a component to the gateway device 108, such as keyboards, mouse devices, and printers.

Illustratively, the memory 312 includes the control logic 313, which may be embodied as any hardware, software, or circuitry to process communications from the cloud service 116 and also format and transmit communications to unit devices 110 in response to communications from the app 104. Further, the storage 314 includes the aforementioned access control data 315 and network configuration data 316.

Figure 4:
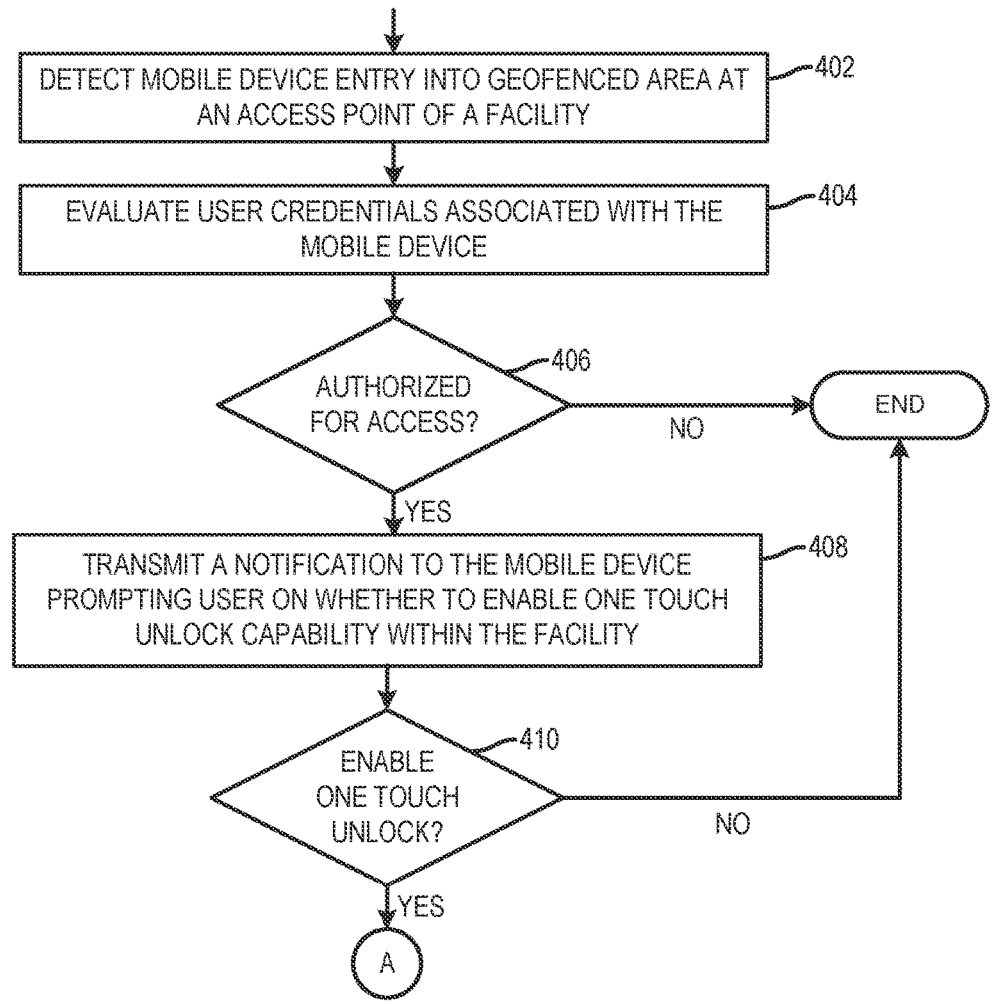
FIGS. 4 and 5 illustrate a flow diagram of an example method for controlling user access to one or more access points and/or units of a storage facility system using a single authentication instance in communication with a mobile device, according to an embodiment.
Figure 5:
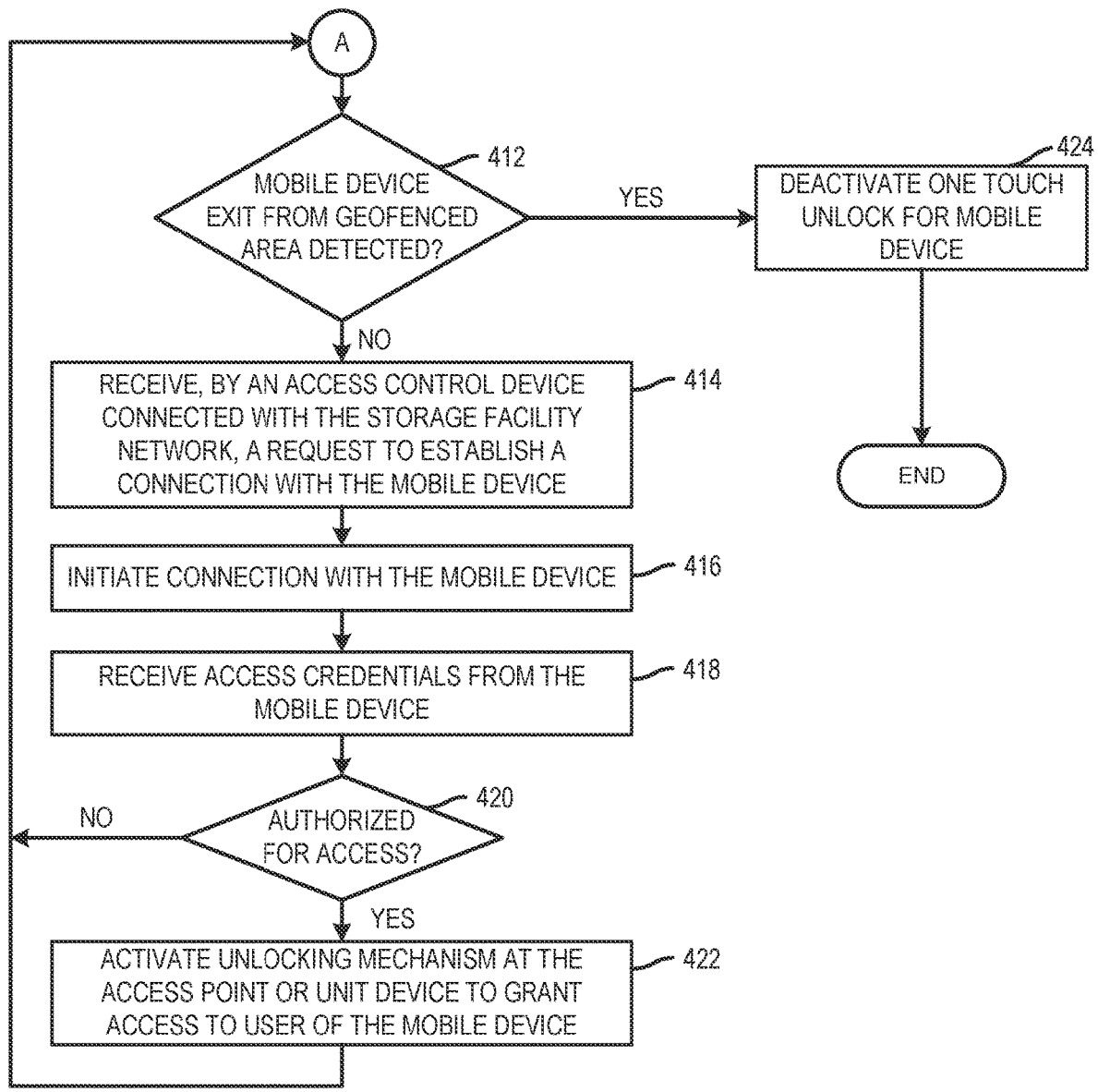

FIGS. 4 and 5 illustrate an example method 400 for controlling user access to one or more access points of a storage facility system using a single authentication instance by the mobile device 102. As shown, the method 400 begins in block 402, where the storage facility system 106 detects entry of the mobile device 102 within a geofenced area and at an access point of the facility. For example, a user may open the app 104, which, in turn, initiates a connection with the cloud service 116. The cloud service 116 may obtain the GPS coordinates of the mobile device 102 (via the location services of the mobile device 102) and correlate the GPS coordinates with the coordinates defined for the geofence.

In block 404, the storage facility system 106 evaluates user credentials associated with the mobile device 102. For example, the app 104 may transmit user information and digital key information to the cloud service 116 for evaluation. In block 406, the storage facility system 106 determines, based on the credentials, whether the user is authorized to access the access point. If not, then the method 400 ends. Otherwise, in block 408, the storage facility system 106 may transmit a notification to the mobile device 102 prompting the user on whether to enable one-touch unlock. The app 104 may display a pop-up window asking for the user's confirmation. In block 410, the storage facility system 106 determines (e.g., based on an indication received from the app 104), whether the user enabled one-touch unlock. If not, then the method 400 ends. Otherwise, the storage facility system 106 enables one-touch unlock, During this process, in block 412, storage facility system 106 continues to determine whether the mobile device 102 is within the geofence or has exited the geofence. If the mobile device 102 has exited the geofence, then in block 424, the storage facility system 106 deactivates one-touch unlock on the mobile device 102.

While the mobile device 102 remains within the geofence and while one-touch unlock is enabled, the mobile device 102 may come into contact with other access points within the facility. The mobile device 102, via the app, may detect the presence of these access points, e.g., via access control devices associated with the access point that are able to wirelessly communicate with the mobile device 102 (e.g., via the Bluetooth wireless communication protocol). The mobile device 102 can establish a wireless connection with the access control device and transmit access credentials (e.g., a digital key) to authenticate with the access control device.

In such a case, in block 414, the storage facility system 106 may receive, by an access control device controlling the access point, a request to establish a connection from the mobile device 102. In block 416, the storage facility system 106 initiates the connection with the mobile device 102. In block 418, the storage facility system 106 receives access credentials from the mobile device 102 and, in block 420, determines whether the mobile device 102 is authorized for access. If not, the storage facility system 106 denies access to the access point, and the method 400 returns to block 412. Otherwise, in block 422, the storage facility system 106 activates an unlocking mechanism at the access point (or unit device) to grant access to the user of the mobile device 102.

Within the present disclosure, devices, systems, and/or methods for ease in access to multiple points of a facility are disclosed. Such access points may include various pathway restrictions gates, doors, and/or other access restriction devices such as turnstiles, gate arms, and/or vehicle impediments (tire spikes, blockades), among others, and/or unit access devices such as doors of various types. Accordingly, a user traveling through a facility may encounter pathway restrictions in various locations and/or having various types. Different pathway restrictions may provide access to different sections of the facility, and the user may need to pass several pathway restrictions to access desired areas and/or units, or may choose particular pathways having multiple pathway restrictions for ease and/or convenience. In some instances, a user may desire access to several different areas and/or units, for example, to access more than one unit. Accordingly, secure access can be facilitated, while providing ease for the user. In some embodiments, time out may be provided to require re-authentication, for example, after extended period without use to gain new access, and such timeout may be user toggled and/or adjustable via mobile device and/or lessor definable, for example, for one or more hours. In such embodiments, one touch authentication can still occur during the time period, and can re-authentication for additional one touch access.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration only, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media which may be read and executed by one or more processors. A machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided in sub-modules, sub-processes or other units of computer code or data as may be required by a particular design or implementation of the computing device.

In the drawings, specific arrangements or orderings of elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships, or associations between elements may be simplified or not shown in the drawings so as not to obscure the disclosure.

This disclosure is considered to be exemplary and not restrictive. In character, and all changes and modifications that come within the spirit of the disclosure are desired to be protected. While particular aspects and embodiments are disclosed herein, other aspects and embodiments will be apparent to those skilled in the art in view of the foregoing teaching.

While the foregoing is directed to embodiments of the present disclosure, other and further embodiments of the disclosure may be devised without departing from the basic scope thereof, and the scope thereof is determined by the claims that follow.

What is claimed is:

1. A method for controlling user access to one or more access points of a self-storage facility using a single authentication instance comprising:
   detecting a mobile device of a user entering a predefined geofence of the self-storage facility;
   upon determining, based on credentials of the user, that the user is authorized for access in the self-storage facility, generating an authentication to grant entry to the user to a plurality of access points to which the user is authorized to access;
   detecting that the user is within a physical proximity of one of the plurality of access points to which the user is authorized to access, and
   responsive to detecting that the user is within a physical proximity of one of the plurality of access points to which the user is authorized to access, activating an unlocking mechanism associated with the one of the one or more access points without re-authentication.

2. The method of claim 1, wherein detecting the mobile device includes connection of the mobile device with a local network of the self-storage facility.

3. The method of claim 2, wherein connection of the mobile device with the local network of the self-storage facility includes connection with at least one of a wifi and mesh network of the self-storage facility.

4. The method of claim 1, wherein detecting the mobile device includes receiving a visit request from a mobile device for access to the self-storage facility.

5. The method of claim 1, wherein generating an authentication includes generating an authentication token.

6. The method of claim 1, further comprising determining, based on credentials of the user, that the user is authorized for access in the self-storage facility.

7. The method of claim 6, wherein determining that the user is authorized for access in the self-storage facility includes confirming user account registration.

8. The method of claim 7, wherein confirming user account registration includes confirming a username and password received from the mobile device.

9. The method of claim 6, wherein determining that the user is authorized for access in the self-storage facility includes confirming an immediately generated passcode communicated to the mobile device and received as confirmation.

10. The method of claim 1, wherein activating an unlocking mechanism associated with the one of the one or more access points includes sending an unlocking command to a locking device associated with an access door of the one or more access points.

11. The method of claim 10, wherein the unlocking command permits the user to manually unlock the access door.

12. The method of claim 1, wherein detecting that the user is within the physical proximity of one of the one or more access points includes receiving location data from the mobile device, and determining proximity of the mobile device relative to the one of the access points.

13. The method of claim 12, wherein the physical proximity comprises a threshold distance from the one of the access points.

14. The method of claim 1, wherein detecting that the user is within the physical proximity of one of the one or more access points includes receiving indication that the user is within local communication range of the one access point.

15. The method of claim 14, wherein receiving indication that the user is within local communication range includes local communication between the mobile device and a local communication device associated with the one access point.

16. The method of claim 15, wherein local communication between the mobile device and a local communication device associated with the one access point includes bluetooth.

17. The method of claim 1, further comprising, detecting that the user is within a physical proximity of another one of the one or more access points to which the user is authorized to access, and activating an unlocking mechanism associated with the other one of the one or more access points.

18. The method of claim 17, wherein activating an unlocking mechanism associated with the other one of the one or more access points is conducted without re-authentication.

19. The method of claim 1, further comprising, receiving instruction from the mobile device for enabling access without additional authentication.

20. The method of claim 19, wherein the instruction is received in response to a request to the mobile device for enabling access without additional authentication.

* * * * *